US005122186A

United States Patent [19]

Hays et al.

[11] Patent Number: 5,122,186

[45] Date of Patent: Jun. 16, 1992

[54] LITHOGRAPHIC DESENSITIZING INK FOR CARBONLESS PAPER

[75] Inventors: Byron G. Hays, Verona; John P. Petrone, Waldwick, both of N.J.

[73] Assignee: BASF Corporation, Parsippany, N.J.

[21] Appl. No.: 653,731

[22] Filed: Feb. 11, 1991

Related U.S. Application Data

[63] Continuation-in-part of Ser. No. 422.851. Oct. 17. 1989. abandoned.

[51] Int. Cl.$^5$ .......................... C09K 3/18; C09D 11/00

[52] U.S. Cl. .......................................... 106/2; 106/20; 106/21; 106/29; 106/30

[58] Field of Search .................... 106/2, 20, 21, 29, 30

[56] References Cited

U.S. PATENT DOCUMENTS

| | | | |
|---|---|---|---|
| 4,022,624 | 5/1977 | Miyamoto et al. | 106/2 |
| 4,078,493 | 3/1978 | Miyamoto | 106/2 |
| 4,101,690 | 7/1978 | Miyamoto et al. | 106/21 |
| 4,125,636 | 11/1978 | Kamio et al. | 106/2 |
| 4,597,793 | 7/1986 | Amon et al. | 106/21 |
| 4,725,315 | 2/1988 | Sano et al. | 106/20 |

*Primary Examiner*—William R. Dixon, Jr.
*Assistant Examiner*—Helene Klemanski
*Attorney, Agent, or Firm*—Michael R. Chipaloski

[57] ABSTRACT

A lithographic desensitizing ink comprises an alkyl amine, a hydroxylated polymerized oil and an acidic resin dissolved in a hydrophobic, hydroxylic solvent, and a pigment, wherein the amine is a secondary or tertiary amine or tertiary amine oxide with substituents of 4 to 12 carbon atoms and wherein the oil has a hydroxyl value of 50 to 250 and a viscosity (ASTM D 803) of 10 to 2000 stokes.

22 Claims, No Drawings

LITHOGRAPHIC DESENSITIZING INK FOR CARBONLESS PAPER

This is a continuation-in-part of copending application(s) Ser. No. 07,022,851 filed on Oct. 17, 1989 now abandoned.

TECHNICAL FIELD

The present invention pertains to desensitizing inks for deactivating areas of the receptor surfaces of carbonless paper duplicating sets. More particularly, these desensitizing compositions may be printed on the carbonless paper by lithographic (wet offset) printing as well a letterpress and dry offset printing.

BACKGROUND ART

The chemical duplicating paper set called carbonless paper has been known for many years. In this duplicating method, the back side (CB) of the top sheet is coated with microcapsules of a nucleophilic, colorless leuco dye and the front side (CF) of the second sheet is coated with an electrophilic acceptor coating capable of catalyzing oxidation and color development of the leuco dye; when one writes or types on the top sheet, the pressure of the writing or typing ruptures the microcapsules of the CB coating and transfers a colored image of the writing/typing to the second sheet. In commerce, it is often desirable to block out certain areas of the second, third, etc., sheets of business forms, so that the latter sheets may be sent, without certain discount, price or other internal business information, to outside parties. To accomplish this blocking out, desensitizing inks are printed on the CF coating and deactivate the CF coating so that no image from the CB coating is transmitted in these areas. These inks often contain opaque white pigments, like titanium dioxide and calcium carbonate, for easier identification of the ink on the press and on the carbonless paper.

Desensitizing inks which can be printed by letterpress or dry offset printing have been known for many years. The active desensitizing agents or desensitizers in these inks are effective as desensitizers for the carbonless paper, but are hydrophilic and interfere with lithographic or wet offset printing. For example, U.S. Pat. No. 4,039,027, to A. Ishizuka, discloses ethoxylated amines and polyamides, but these hydrophilic desensitizers would react with the acidic fountain solutions used in lithographic printing and either prevent the ink from printing in the desired image areas to be blocked out ("blinding") or cause it to print also in the nonimage area ("scumming"). U.S. Pat. No. 4,078,493, to A. Miyamoto, mentions the impossibility of using lithography for printing desensitizing inks and discloses an unusual dry reverse lithographic printing process, which does not employ fountain solutions for keeping the nonimage areas clean and which can use hydrophilic ethoxylated amines.

For desensitizing inks that can be printed by lithographic or wet offset printing, some unusual hydrophobic desensitizers have been claimed. For example, U.S. Pat. No. 4,101,690, to A. Miyamoto and H. Marsukawa, discloses hydrophobic ethoxylated/propoxylated amines as desensitizers. U.S. Pat. No. 4,287,234, to A. Amon et al, mentions that amines and diamines of high molecular weight cannot be used in lithographic printing and discloses alkoxylated nucleophiles, such as ethoxylated alkylphenols and ethylene oxide/propylene oxide copolymers of low (i.e., hydrophobic) hydrophilic-lipophilic balance (HLB). Although these amine-free adducts are claimed to be effective desensitizers, later patents by A. Amon and R. Weil (see below) plus our experience indicate that compounds containing amine groups are essential for effective desensitizing. U.S. Pat. No. 4,597,793, to Amon and Weil, mentions that ethylene oxide/propylene oxide copolymers are incomplete desensitizers, that adducts containing nucleophilic amino or imino groups have much greater desensitizing effect and discloses low HLB propoxylated polyamines as desensitizers plus emulsified water. Japanese 1,105,776 and 63,139,781 disclose hydrophobic butylene oxide adducts of polyamines as desensitizers for lithographic inks U.S. Pat. No. 4,599,111, to Amon and Weil, discloses as desensitizers alkoxylated compounds bridged by polyisocyanates or polyacids; this bridging is a rather extreme approach to improve the transfer of ithographic desensitizing inks by increasing the molecular weight of the nucleophilic alkoxylated desensitizer.

Since it is the amine groups that are most effective in desensitizing carbonless paper, diluting the concentration of amine groups by adding long poly(propylene oxide) chains (as in U.S. Pat. No. 4,101,690 and 4,597,793) means that much more of hydrophobic polymer is required for effective desensitization, a costly approach. Similarly, using the desensitizer as a viscosity increasing component (as in U.S. Pat. No. 4,599,111) means that more of the expensive desensitizer is used than may be required for effective desensitization, also a costly approach.

Accordingly, the art can benefit from lithographic desensitizing inks made with less costly, simpler, more readily available raw materials.

DISCLOSURE OF THE INVENTION

Lithographic desensitizing inks are disclosed comprising an alkyl amine, a hydroxylated polymerized oil, and an acidic resin dissolved in a hydrophobic, hydroxylic solvent and a pigment, wherein the amine is selected from the group consisting of secondary and tertiary amines and tertiary amine oxides, wherein the amine comprises alkyl substituents of about 4 to 12 carbon atoms, wherein the oil has a hydroxyl value (ASTM D 1957) of about 50 to 250, wherein the oil has a viscosity (ASTM D 803) of about 10 to 2000 stokes, wherein the resin is selected from the group consisting of natural rosins and stabilized rosins, wherein the solvent is selected from the group consisting of ethylene oxide/propylene oxide block copolymers and polypropylene glycols, and wherein the pigment is selected from the group consisting of white pigments and extender pigments.

BEST MODE FOR CARRYING OUT THE INVENTION

A clear, colorless desensitizing composition can be used. However, a white ink is preferred for easy identification of how well the ink is printing (on the plate and blanket of a lithographic offset press, it is easy to see a dense white on the image area and absence of white in the non-image area), how well the pressman has cleaned up the press and how well the printed image is in register on the carbonless paper to block out the appropriate areas. Accordingly, the composition preferably contains a white pigment like rutile or anatase titanium dioxide, zinc oxide or zinc sulfide, along with an extender pigment like calcium carbonate, silica, silicates barium sulfate, calcium sulfate, hydrated aluminum oxide and aluminum hydrate. The amount of pigments can be about 20 to 35 percent by weight. For increasing the yield value of the ink, hydrophobic fumed silica is added, along with a small amount of gelled aliphatic oil.

As the principal vehicle for the ink, an acidic resin is dissolved in a hydrophobic, hydroxylic solvent. Suitable acidic resins include rosin, wood rosin, gum resin hydrogenated rosin, dehydrogenated rosin, maleated rosin, and fumarated rosin; the inexpensive tall oil rosin is especially preferred. The amount of the acidic resin can be about 15 to 20 percent by weight. As stated above, hydrophobic means that the solvent has a low HLB, say 1-7. Hydroxylic means that the solvent contains one or more hydroxyl groups. The hydrophobic hydroxylic solvent is preferably a high molecular weight ethylene oxide/propylene oxide copolymer containing about 10 percent polyethylene oxide and has an average molecular weight of about 2700 to 3400 (e.g., BASF Corporation's Pluronic ® 312R1, which has an HLB of 1-7, contains two hydroxyl groups per molecular and has a molecular weight of about 3250) or polypropylene glycol (which also contains two hydroxyl groups per molecule); aliphatic oils, the usual solvents for lithographic inks, did not give prints with clean non-image areas as did the preferred solvents. The amount of the hydrophobic, hydroxylic solvent can be about 25 to 40 percent by weight.

*P. Becher and R.L. Birkmeier, J. A. Oil Chem. Soc., 41, 169 (1964)

For imparting "length" and good transfer to the ink, it was surprising and unexpected that only hydroxylic oils (i.e., oils that contain one or more hydroxyl groups), such as polymerized castor oils, worked well. Contrary to the wide variety of resins (e.g., acid phenolic and rosin ester in the U.S. Pat. No. 4,597,793) often mentioned as usable in desentizing inks, only polymerized castor oils showed good compatability with the vehicle of rosin dissolved in a hydrophobic hydroxylic solvent and gave the rheology and transfer required of lithographic inks. These polymerized castor oils have hydroxyl values(ASTM D 1957) from about 80 to 140 and viscosities (ASTM D 445) from about 120 to 800 stokes. The amount of the hydroxylated oil can be about 10 to 25 percent, preferably 15 to 20 percent, by weight.

For desensitizers, it was surprising and unexpected that certain relatively simple secondary and tertiary amines and tertiary amine oxides could be used. Contrary to the opinions expressed in U.S. Pat. No. 4,287,234, et al, these medium-length carbon chain alkyl amines were effective desensitizers without adversely affecting ink transfer or causing the scumming, etc., usually observed with amines in lithography. The secondary amines which can be used as desensitizers include straight chain dialkyl amines such as dihexyl amine, dioctyl amine and didecyl amine, branched chain dialkyl amines such as di(2-ethylhexyl) amine as well a cyclic dialkylamines such as N-isopropylcyclohexyl amine and dicyclohexyl amine. The tertiary amines which can be used as desensitizers include straight chain alkyl dimethyl amines such as decyl dimethyl amine and dodecyldimethyl amine, straight chain dialkyl methyl amines such as dioctyl methyl amine and didecyl methyl amine, straight chain trialkyl amines such as tributyl amine, trihexyl amine and trioctyl amine, branched chain amines such as tri-iso-octyl amine, cyclic amines such as cyclohexyl diethyl amine, benzyl amines such as benzyl diethyl amine, and heterocyclic amines such as dipiperidino methane, bis(3-methyl piperidino)methane and 1,2-dipiperidino ethane. The tertiary amine oxides which can be used as desensitizers include dialkylmethyl amine oxides such as dioctyl-and didecyl-methyl amine oxide. The preferred amines include dioctyl amine, di(2-ethylhexyl) amine, didecylmethyl amine, dodecyldimethyl amine and didecylmethyl amine oxide. The amount of the amine can be about two to ten percent, preferably four to six percent, by weight.

The following examples illustrate several preferred embodiments of the present invention. Unless otherwise specified, all parts and percents given are parts and percents by weight.

EXAMPLE 1

A white lithographic desensitizing base ink (without desensitizers) was prepared by high speed disc dispersing 145 parts titanium dioxide (e.g., DuPont's Ti-Pure ® R-900), 68 parts calcium carbonate (e.g., Mississippi Lime's precipitated, technical grade) and 68 parts hydrophobic fumed silica (e.g., Cabot's Aerosil ® R-972) in a varnish made of 175 parts tall oil rosin (e.g., Union Camp's Unitol ® NCY) dissolved in 301 parts ethylene oxide/propylene oxide block copolymer (e.g., BASF Corporation's Pluronic ® 31R1), 175 parts polymerized castor oil (e.g., CasChem's #40 oil) and 22 parts gelled solvent (e.g., Magie Brothers' Magiesol ® 52). To 96 part aliquots of this base ink were added 4 parts of each of various alkylamines, as listed in Table I. As expected, even though these inks had tacks and Laray viscosities and yield values in the usual ranges for offset inks, most of the amines gave inks with poor transfer from the lithographic plate to the blanket to the paper. The primary amines ranging from dodecylamine to N-(octadecenyl/hexadecenyl)-1,3-propanediamine gave poor transfer from the litho plate (much scumming of nonimage areas), poor desensitization and tended to impart an unattractive yellow hue to the white inks. Surprisingly, the four medium length (eight to twelve carbon atoms) secondary and tertiary amines—dioctylamine, di(2-ethyl. hexyl)amine, didecylmethyl amine and dodecyldimethyl amine—gave both good transfer and good desensitization. The slightly longer chain dodecyl/tetradecyl amine gave slightly poorer transfer, but good desensitization. The longer chain tertiary amines, from di(dodecyl/tetradecyl) methyl amine to N-(octadecyl/hexadecyl)-N,N',N'-trimethyl-1,3-propanediamine gave poor - fair transfer and desensitization. As a control, the 4 parts of amine were replaced by an additional 4 parts ethylene oxide/propylene oxide copolymer (i.e., Pluronic 31Rl) to give an ink containing no amine: this ink showed poor transfer and almost no desensitization.

TABLE 1

| 4% Amine | | Lithographic Ink Properties | | | | | | |
|---|---|---|---|---|---|---|---|---|
| | | | Vis- | Yield | Transfer from | Duke Water Pickup[5] | | Desensi- |
| Chemical Name | Source[1] | Tack[2] | cosity[3] | Value[3] | Litho Plate[4] | Percent | Turbidity | tization[6] |
| Primary Amines | | | | | | | | |
| Dodecyl amine | Armeen ® 12D[a] | 12.9 | 275 | 840 | Poor/Fair | 42 | Low | Poor |

TABLE 1-continued

| 4% Amine | | Lithographic Ink Properties | | | | | | |
|---|---|---|---|---|---|---|---|---|
| | | | Vis- | Yield | Transfer from | Duke Water Pickup[5] | | Desensi- |
| Chemical Name | Source[1] | Tack[2] | cosity[3] | Value[3] | Litho Plate[4] | Percent | Turbidity | tization[6] |
| Dodecyl/tetradecyl amine | Jet Amine ® PCD[b] | 11.4 | 165 | 545 | Poor | — | — | Poor |
| Octadecenyl/hexadecenyl amine | Jet Amine POD[b] | 10.9 | 210 | 870 | Poor | — | — | Poor |
| N-(Octadecenyl/hexadecenyl)-1,3-propane diamine | Jet Amine DO[b] | 10.9 | 170 | 545 | Poor | — | — | Poor |
| Secondary Amines | | | | | | | | |
| Dioctylamine | Dioctyl-amine[c] | 11.5 | 175 | 665 | Good | 50 | Low | Good |
| Di(2-ethylhexyl) amine | Di(2-ethyl-hexyl)amine[d] | 12.9 | 205 | 625 | Good | 44 | Low | Good |
| Tertiary Amines | | | | | | | | |
| Didecylmethyl amine | DAMA ® 1010[e] | 11.3 | 175 | 650 | Good | 42 | Low | Good |
| Dodecyldimethyl amine | ADMA ® 12[e] | 12.4 | 190 | 650 | Good | 40 | Low | Good |
| Dodecyl/tetra-decyl dimethyl amine | Armeen DMCD[a] | 12.1 | 170 | 500 | Fair/Good | 60 | Low | Good |
| Di(dodecyl/tetra-decyl) methyl amine | Armeen M2C[a] | 11.7 | 140 | 635 | Poor/Fair | 34 | Low | Poor |
| Octadecyl/hexadecyl dimethyl amine | Armeen DMTD[a] | 11.8 | 140 | 610 | Poor/Fair | 34 | Medium | Fair |
| N-(Octadecyl/hexadecyl)-N,N',N'-trimethyl-1,3-propane diamine | Duomeen ® TTM[a] | 12.6 | 205 | 785 | Poor/Fair | 44 | Low | Fair |
| None | Pluronic 31R1 | 12.9 | 215 | 600 | Poor | 50 | Low | Poor |

(1)(a) Armak Chemical; (b) Jetco Chemicals; (c) Davos Chemical; (d) BASF; (e) Ethyl
(2)After one minute on Thwing-Albert Inkometer at 1200 rpm.
(3)Laray rheometer
(4)A Fuji negsative letho plate, etched with 100%/75%, 50% and 25% screens, was prewet by a sponge with fountain solution (3 oz./gal. BASF Excelith Complete A.R., pH 4.6, 1800 mhos conductivity). The ink (4 notches from Inkometer pipet) was rolled out with a brayer roll on a Little Joe press platform, then used to ink up the freshly prewet litho plate. The ink on the plate was then printed on the Little Joe blanket and the ink transfer judged (whiteness of 100% area; lack of scumming in non-image area). The ink on the blanket was thenprinted on black construction paper and the transfer judged again.
(5)cf. TAGA Proceedings: 1980, pp. 222, and 1983, pp 191. This test was run with the fountain solution of footnote (4). The percent water pickup and turbidity of residual fountain solution were observed after 6 minutes of mixing.
(6)The procedure of footnote (4) was followed, except that the inked blanket of the Little Joe press was printed on NCR CFB 14# Blue Print paper (53 g/m$^2$). An NCR CB sheet was placed over the printed sheet, then a ballpoint pen was used to write on the set; desensitization of the 100% area was judged immediately after printing and one day later.

EXAMPLE 2

The procedure of Example 1 was followed, except that 5 parts of an 80% solution (equals 4 parts active) of didecylmethyl amine oxide (Ethyl Corp's Damox ® 1010) was added to 95 parts of base ink. Properties of this ink are shown in Table 2. This amine oxide gave as good lithographic and desensitizing properties as the best amines in Table 1.

TABLE 2

| 4% Amine | | Lithographic Ink Properties[1] | | | | | | |
|---|---|---|---|---|---|---|---|---|
| | | | Vis- | Yield | Transfer from | Duke Water Pickup | | Desensi- |
| Chemical Name | Source | Tack | cosity | Value | Litho Plate | Percent | Turbidity | tization[1] |
| Didecyl Methyl Amine Oxide | Damox ® 1010 | 13.2 | 200 | 620 | Good | 46 | Low | Good |

(1)See Footnotes in Table 1

EXAMPLE 3

The procedure of Example 1 was followed, except that higher levels of three of the best desensitizers listed in Examples 1 and 2 were added to the base ink. Properties of the inks are shown in Table 3. The higher levels of desensitizers gave good desensitization without adversely affecting transfer and other ink properties.

TABLE 3

| Desensitizer | | Lithographic Ink Properties[2] | | | | | | |
|---|---|---|---|---|---|---|---|---|
| | | | Vis- | Yield | Transfer from | Duke Water Pickup | | Desensi- |
| Chemical Name | Percent | Tack | cosity | Value | Litho Plate | Percent | Turbidity | tization[2] |
| Di(2-ethylhexyl) amine | 5.0 | 11.0 | 210 | 680 | Good | 40 | Low | Good |
| Didecylmethyl amine | 4.9 | 12.6 | 160 | 565 | Good | 44 | Low | Good |
| Didecylmethyl | 4.6[1] | 13.2 | 180 | 530 | Good | 46 | High | Good |

TABLE 3-continued

| Desensitizer | | | Lithographic Ink Properties[2] | | | | | |
|---|---|---|---|---|---|---|---|---|
| | | | Vis- | Yield | Transfer from | Duke Water Pickup | | Desensi- |
| Chemical Name | Percent | Tack | cosity | Value | Litho Plate | Percent | Turbidity | tization[2] |
| amine oxide | | | | | | | | |

[1]From 5.8% Damox ® 1010 (80% amine oxide)
[2]See footnotes in Table 1.

EXAMPLE 4

The procedure of Example 1 was followed, except that the 175 parts polymerized castor oil were omitted and that 40 parts di(2-ethyl hexyl) amine were included; this gave a white desensitizing base ink, without the tack- and viscosity-increasing vehicle. To 82.5 part aliquots of this base ink were added 17.5 parts of each of the various oils, as listed in Table 4. The first six oils had hydroxyl values (ASTM D 1957) from 78 to 160 and, except for the lowest viscosity Pale 170, gave Fair/-Good to Good transfer. The last six oils are of various types and viscosities, but all have essentially no hydroxyl value and all gave Poor transfer, except for the Poor/Fair transfer for the maleated soybean oil.

TABLE 4

| 17.5% Vehicle | | | | Lithographic Ink Properties[2] | | | | | | |
|---|---|---|---|---|---|---|---|---|---|---|
| | | Hydroxyl | Vis- | | Vis- | Yield | Transfer from | Duke Water Pickup | | Desensi- |
| Chemical Name | Source[1] | Value | cosity | Tack | cosity | Value | Litho Plate | Percent | Turbidity | tization[2] |
| Polymerized Castor Oil | #40 Oil[(a)] | 135 | 800 | 11.7 | 150 | 540 | Good | 44 | Low | Good |
| Polymerized Castor Oil | Vorite 120[(a)] | 78 | 700 | 12.8 | 150 | 600 | Fair/Good | 54 | Medium | Good |
| Polymerized Castor Oil | Pale 16[(a)] | 136 | 250 | 6.6 | 140 | 530 | Fair/Good | 36 | Low | Good |
| Polymerized Castor Oil | Pale 1000[(a)] | 139 | 120 | 10.5 | 145 | 520 | Fair/Good | 60 | Low | Good |
| Polymerized Castor Oil | Vorite 105[(a)] | 130 | 26 | 6.3 | 60 | 260 | Fair/Good | 36 | Medium | Good |
| Polymerized Castor Oil | Pale 170[(a)] | 160 | 11 | 5.5 | 50 | 205 | Fair | — | — | Good |
| Dehydrated Castor Oil | Copolymer 186[(a)] | ~0 | 250 | 9.6 | 105 | 490 | Poor | — | — | — |
| Polymerized Linseed Oil | M-25 OKO[(b)] | ~0 | 600 | 10.1 | — | — | Poor | — | — | — |
| Epoxidized Linseed Oil | Vikoflex 7190[(c)] | ~0 | 6 | 6.0 | 50 | 190 | Poor | — | — | — |
| Blown Soybean Oil | Special T-Blown $Z_7$-$Z_8$[(b)] | ~0 | 600 | 8.0 | 95 | 305 | Poor | — | — | — |
| Epoxidized Soybean Oil | Vikoflex 7170[(c)] | ~0 | 3 | 6.2 | 55 | 170 | Poor | — | — | — |
| Modified Soybean Oil | Dri-Soy $Z_2$-$Z_3$[(b)] | ~0 | 40 | 7.5 | 95 | 470 | Poor/Fair | — | — | — |

[1](a) CasChem (b) Spencer-Kellogg (c) Viking Chemical
[2]See Footnotes in Table 1

EXAMPLE 5

The procedure of Example 4 was followed, except that 17.5 parts of various varnishes were added to 82.5 part aliquots of the base ink. These varnishes were prepared by dissolving 40 parts of various types of resins (mentioned in the earlier cited U.S. Pat. No. patents on lithographic desensitizing inks) in 60 parts ethylene oxide/ propylene oxide copolymer (Pluronic ® 31R1); this addition resulted in the finished ink containing 7.0% resin and 10.5% Pluronic 31R1 in place of the 17.5% polymerized castor oil. The tall oil rosin gave much lower tack and Laray rheology, much higher water pickup and decreased ink transfer. The rosin ester gave poor transfer, high turbity of the residual fountain solution and poor/fair desensitization. The phenolated rosin ester gave a high water pickup with high turbidity of the residual fountain solution and only fair/good transfer and desensitization. The phenolated terpene gave poor transfer and poor/fair desensitization. The phenolic resin gave only fair/good transfer and desensitization. In summary, substitution of these resins gave inks with poorer transfer and poorer desensitization.

TABLE 5

| 7% Resin | | | Lithographic Ink Properties[2] | | | | | |
|---|---|---|---|---|---|---|---|---|
| | | | Vis- | Yield | Transfer from | Duke Water Pickup | | Desensi- |
| Chemical Name | Source | Tack | cosity | Value | Litho Plate | Percent | Turbidity | tization[2] |
| Tall Oil Rosin | Unitol ® NCY[(a)] | 5.8 | 85 | 225 | Fair/Good | 82 | Medium | Good |
| Rosin Ester | Pentalyn ® C[(b)] | 7.5 | — | — | Poor | 36 | High | Poor/Fair |
| Phenolated Rosin Ester | Jonrez ® RP365[(c)] | 9.2 | 100 | 275 | Fair/Good | 94 | High | Fair/Good |
| Phenolated terpene | Nirez ® V2040[(d)] | 10.4 | — | — | Poor | 42 | High | Poor/Fair |
| Phenolic | Varcum ® | 10.4 | 125 | 335 | Fair/Good | 36 | High | Fair/Good |

TABLE 5-continued

| 7% Resin | | Lithographic Ink Properties[2] | | | | | | Desensi- |
|---|---|---|---|---|---|---|---|---|
| | | | Vis- | Yield | Transfer from | Duke Water Pickup | | |
| Chemical Name | Source | Tack | cosity | Value | Litho Plate | Percent | Turbidity | tization[2] |
| | 29-000[(e)] | | | | | | | |

[1](a) Union Camp (b) Hercules (c) Westvaco (d) Reichold (e) BTL Speciality Resins.
[2]See Footnotes in Table 1

EXAMPLE 6

The procedure of Example 1 was followed, except that a lower molecular weight ethylene oxide/propylene oxide copolymer (e.g., Pluronic 25R1) and 4% dioctylamine were used. Properties of the ink are shown in Table 6. The lower average molecular weight copolymer (2700 vs. 3250 for 31R1, both with 10% ethylene oxide) gave slightly lower tack, rheology and water pick-up, but transfer and desensitization remained good.

TABLE 6

| Glycol | | Lithographic Ink Properties[2] | | | | | | Desensi- |
|---|---|---|---|---|---|---|---|---|
| | | | Vis- | Yield | Transfer from | Duke Water Pickup | | |
| Chemical Name | Source[1] | Tack | cosity | Value | Litho Plate | Percent | Turbidity | tization[2] |
| Polyethylene/propylene Glycol | Pluronic ® 31R1 | 11.5 | 175 | 665 | Good | 50 | Low | Good |
| Polyethylene/propylene Glycol | Pluronic ® 25R1 | 10.7 | 150 | 530 | Good | 36 | Low | Good |

[1]BASF
[2]See Footnotes in Table 1

EXAMPLE 7

The procedure of Example 1 was followed, except that polypropylene glycol (i.e., Dow PPG 4000) was substituted for the ethylene oxide/propylene oxide copolymer and 4% di(2-ethyl hexyl) amine was used. Properties of the ink are shown in Table 7. The polypropylene glycol gave an ink with higher tack and viscosity, with lower water pickup and slightly poorer transfer and desensitization.

TABLE 7

| Glycol | | Lithographic Ink Properties[2] | | | | | | Desensi- |
|---|---|---|---|---|---|---|---|---|
| | | | Vis- | Yield | Transfer from | Duke Water Pickup | | |
| Chemical Name | Source[1] | Tack | cosity | Value | Litho Plate | Percent | Turbidity | tization[2] |
| Polyethylene/propylene Glycol | Pluronic ® 31R1[(a)] | 12.9 | 205 | 625 | Good | 44 | Low | Good |
| Polypropylene Glycol | PPG 4000[(b)] | 15.6 | 330 | 495 | Fair/Good | 30 | Very Low | Fair/Good |

[1](a) BASF (b) Dow
[2]See Footnotes in Table 1

EXAMPLE 8

The procedure of Example 1 was followed except that a hydrogenated rosin (i.e., Hercules' Stabelite ®) was substituted for the tall oil rosin and 4% di(2-ethylhexyl) amine was used. Properties of the ink are shown in Table 7. The hydrogenated rosin gave slightly lower ink properties, including water pickup, and gave slightly poorer ink transfer and desensitization.

TABLE 8

| Rosin | | Lithographic Ink Properties[2] | | | | | | Desensi- |
|---|---|---|---|---|---|---|---|---|
| | | | Vis- | Yield | Transfer from | Duke Water Pickup | | |
| Chemical Name | Source[1] | Tack | cosity | Value | Litho Plate | Percent | Turbidity | tization[2] |
| Tall Oil | Unitol ® NCY[(a)] | 12.9 | 205 | 625 | Good | 44 | Low | Good |
| Hydrogenated | Staybelite ®[(b)] | 12.4 | 190 | 545 | Fair/Good | 36 | Low | Fair/Good |

[1](a) Union Camp (b) Hercules
[2]See Footnotes in Table 1

We claim:

1. A lithographic desensitizing composition comprising an alkyl amine, a hydroxylated polymerized oil, and an acidic resin, wherein the amine, the oil and the resin are dissolved in a hydrophobic, hydroxylic solvent.

2. The composition of claim 1 wherein the composition further comprises at least one member selected from the group consisting of pigments and dyes.

3. The composition of claim 1 wherein the amine is selected from the group consisting of secondary amines, tertiary amines and tertiary amine oxides.

4. The composition of claim 1 wherein the alkyl groups of the amine comprise at least on member selected from the group consisting of alkyl substituents of from about 4 to about 12 carbon atoms.

5. The composition of claim 1 wherein the alkyl groups of the amine comprise at least one member selected from the group of alkyl residues consisting of straight chain, branched chain, cyclic, heterocyclic and benzyl groups.

6. The composition of claim 2 wherein the amine comprises at least one member selected from the group consisting of di(2-ethylhexyl) amine, dioctyl amine, didecylmethyl amine, dodecyl dimethyl amine and didecylmethyl amine oxide.

7. The composition of claim 1 wherein the composition comprises the amine in an amount of from about two percent to about ten percent by weight.

8. The composition of claim 1 wherein the oil has a hydroxyl value of from about 50 to about 250.

9. The composition of claim 1 wherein the oil has a viscosity of from about 10 to about 2000 stokes.

10. The composition of claim 2 wherein the oil comprises at least one member selected from the group consisting of polymerized castor oils having a hydroxyl value of from about 80 to about 140 and having a viscosity of from about 120 stokes to about 800 stokes.

11. The composition of claim 1 wherein the resin comprises at least one member selected from the group consisting of tall oil rosins, gum rosins and wood rosins 12. The composition of claim 1 wherein the resin comprises at least one member selected from the group consisting of hydrogenated rosins and dehydrogenated rosins.

13. The composition of claim 1 wherein the resin comprises at least one member selected from the group consisting of maleated rosins and fumarated rosins.

14. The composition of claim 2 wherein the resin comprises at least one member selected from the group consisting of tall oil rosins, gum rosins and wood rosins.

15. The composition of claim 1 wherein the solvent comprises at least one member selected from the group of hydrophobic propoxylated solvents consisting of ethylene oxide/propylene oxide block copolymers and polypropylene glycols.

16. The composition of claim 2 wherein the solvent comprises at least one member selected from the group consisting of ethylene oxide/propylene oxide block copolymers, wherein the copolymers comprise about 10 percent polyethylene oxide, and wherein the copolymers have an average molecular weight of from about 2700 to about 3400.

17. The composition of claim 2 wherein the pigment comprises at least one member selected from the group consisting of titanium dioxide, zinc oxide and zinc sulfide.

18. The composition of claim 2 wherein the pigment comprises at least one member selected from the group consisting of rutile titanium dioxide and anatase titanium dioxide.

19. The composition of claim 2 wherein the pigment further comprises an extender pigment, wherein the extender pigment is at least one member selected from the group consisting of calcium carbonates, silicas, silicates, barium sulfates, calcium sulfates, hydrated aluminum oxides and alumina hydrates.

20. The composition of claim 2 wherein the pigment further comprises at least one member selected from the group consisting of calcium carbonates and hydrophobic silicas.

21. A lithographic desensitizing ink comprising an alkyl amine, a hydroxylated polymerized oil, an acidic resin, and a pigment, wherein the amine, the oil and the resin are dissolved in a hydrophobic, hydroxylic solvent; and wherein the amine comprises at least one member selected from the group consisting of di(2-ethylhexyl) amine, dioctyl amine, didecylmethyl amine, dodecyldimethyl amine and didecylmethyl amine oxide; and wherein the ink comprises the amine in an amount from about four percent to about six percent by weight; and wherein the oil comprises at least one member selected from the group consisting of polymerized castor oils having a hydroxyl value of from about 80 to about 140 and having a viscosity of from about 120 stokes to about 800 stokes; and wherein the ink comprises the oil in an amount from about 15 percent to about 20 percent by weight; and wherein the acidic resin comprises at least one member selected from the group consisting of tall oil rosins, gum rosins and wood rosins; and wherein the ink comprises the resin in an amount from about 15 percent to about 20 percent by weight; and wherein the solvent further comprises at least one member selected from the group consisting of ethylene oxide/propylene oxide block copolymers, where in the copolymers comprise about 10 percent polyethylene oxide and wherein the copolymers have an average molecular weight of from about 2700 to about 3400; and wherein the ink comprises the solvent in an amount from about 25 percent to about 40 percent by weight; and wherein the pigment further comprises at least one member selected from the group consisting of titanium dioxide, calcium carbonate and hydrophobic silica; and wherein the ink comprises the pigment in an amount from about 20 percent to about 35 percent by weight.

22. A lithographic desensitizing ink comprising di(2-ethylhexyl) amine, polymerized castor cil having a hydroxyl value (ASTM D 1957) of 135, ethylene oxide/-propylene oxide solvent containing about 10 percent polyethylene oxide and having a molecular weight of 3250 and pigment comprising a mixture of titanium dioxide, calcium carbonate and hydrophobic silica.

* * * * *